United States Patent
Mantin

(10) Patent No.: US 11,397,795 B2
(45) Date of Patent: Jul. 26, 2022

(54) MECHANISM FOR PROVIDING OBFUSCATED CODE TO WEB APPLICATION CLIENTS

(71) Applicant: Imperva, Inc., Redwood City, CA (US)

(72) Inventor: Itsik Mantin, Shoham (IL)

(73) Assignee: Imperva, Inc., San Mateo, CA (US)

( * ) Notice: Subject to any disclaimer, the term of this patent is extended or adjusted under 35 U.S.C. 154(b) by 433 days.

(21) Appl. No.: 16/529,613

(22) Filed: Aug. 1, 2019

(65) Prior Publication Data

US 2021/0034718 A1 Feb. 4, 2021

(51) Int. Cl.
*G06F 21/14* (2013.01)
*G06F 9/54* (2006.01)

(52) U.S. Cl.
CPC ............. *G06F 21/14* (2013.01); *G06F 9/547* (2013.01); *G06F 2221/0748* (2013.01)

(58) Field of Classification Search
CPC ... G06F 21/14; G06F 9/547; G06F 2221/0748
See application file for complete search history.

(56) References Cited

U.S. PATENT DOCUMENTS

| | | | | |
|---|---|---|---|---|
| 9,887,969 | B1* | 2/2018 | Shemesh | H04L 9/0643 |
| 2004/0260933 | A1* | 12/2004 | Lee | G06F 21/14 |
| | | | | 713/193 |
| 2007/0039048 | A1* | 2/2007 | Shelest | G06F 21/566 |
| | | | | 726/22 |
| 2016/0132667 | A1* | 5/2016 | Freitas Fortuna dos Santos | ........ |
| | | | | H04L 9/14 |
| | | | | 713/189 |
| 2017/0359319 | A1* | 12/2017 | Kelsey | H04W 12/03 |
| 2019/0220576 | A1* | 7/2019 | Carnevale | G06F 16/9566 |

OTHER PUBLICATIONS

Github-Gist, "brettz9 / navigator.language.js", Available Online at <https://web.archive.org/web/20130927041425/https://gist.github.com/brettz9/6150009>, Archived Sep. 27, 2013, Retrieved on Feb. 16, 2022, pp. 1-2.
Manrique, Hugo, "HTML5 Cross Browser Polyfills", Modernizr/Modernizr, edited on Dec. 30, 2018, Available Online at <https://github.com/Modernizr/Modernizr/wiki/HTML5-Cross-browser-Polyfills>, Retrieved on Feb. 15, 2022, pp. 1-25.

* cited by examiner

*Primary Examiner* — Hee K Song
(74) *Attorney, Agent, or Firm* — Nicholson, De Vos, Webster & Elliott, LLP

(57) ABSTRACT

A method by one or more network devices for providing obfuscated code to web application clients. The method includes determining a configuration utilized by a web application client based on a header of a web application layer request generated by the web application client, selecting, for providing to the web application client with a web application layer response corresponding to the web application layer request, an obfuscated code from a plurality of obfuscated codes for the configuration utilized by the web application client, where the plurality of obfuscated codes for the configuration utilized by the web application client provide the same intended functionality but are obfuscated differently from each other, and providing the selected obfuscated code to the web application client with the web application response.

20 Claims, 6 Drawing Sheets

MECHANISM FOR PROVIDING OBFUSCATED CODE TO WEB APPLICATION CLIENTS

TECHNICAL FIELD

Embodiments of the invention relate to the field of computer networks, and more specifically, to providing obfuscated code to web application clients.

BACKGROUND ART

A web application server is system software (running on top of an operating system) executed by server hardware upon which web applications run. Web application servers may include a web server (e.g. Apache, Microsoft® Internet Information Server (IIS), nginx, lighttpd), which delivers web pages on the request of web application clients (e.g., HyperText Transfer Protocol (HTTP) clients using HTTP), and may also include an application server that executes procedures (i.e., programs, routines, scripts) of a web application. Web applications are computer software applications made up of one or more files including computer code that run on top of web application servers and are written in a language the web application server supports. Web applications are typically designed to interact with web application clients by dynamically generating web application layer responses (e.g., HTTP response messages) responsive to web application layer request messages (e.g., HTTP request messages) sent by those web application clients.

Web applications clients interact with web applications by sending web application layer requests to web application servers, which execute portions of web applications and return web application data/content (e.g., HyperText Markup Language (HTML) page) in the form of web application layer responses (e.g., HTTP response messages) back to the web application clients, where the web application data/content may be rendered by the web application clients (e.g., using the rendering engine of a web browser). Thus, web applications may be provided using a request-response protocol (e.g., HTTP) in a client-server computing model, where the web application servers typically act as the "server" and the web application clients typically act as the "client."

By way of an operational example, a web application client may request a web page from a web application server by sending it an HTTP request message. For example, to access the web page corresponding to the Uniform Resource Locator (URL) of "http://www.example.org/index.html", the web browser may connect to the web application server at www.example.org by sending it an HTTP request message using a "GET" method, which may look like the following:
GET/index.html HTTP/1.1
Host: www.example.org The web application server may reply by sending a set of HTTP headers along with the requested web page, which collectively is called an HTTP response message.

Web security systems such as web application layer attack detectors (e.g., a web application firewall), bot detection systems, and account protection systems may utilize Javascript code in web application clients to perform a variety of tasks such as bot protection, persistent identification, and client classification.

In the context of software development, obfuscation refers to the deliberate act of generating code that is difficult for humans to understand in order to conceal its purpose, its logic, and/or implicit values embedded in it, which helps deter reverse engineering and tampering. Since Javascript code is typically executed in an untrusted environment (e.g., in the web application client), it is often a target for reverse-engineering and tampering. Thus, obfuscation is sometimes applied to Javascript code to hide its operations.

Some web security systems provide additional security by creating a pool of obfuscated Javascript codes, where all of the obfuscated Javascript codes in the pool provide the same or essentially the same functionality but are obfuscated differently from each other, and picks one of these obfuscated Javascript codes from the pool each time the Javascript code is needed, thereby making the Javascript code a moving target.

The size of a Javascript code and its operations may have a significant impact on the end-user experience. Thus, it is desirable that Javascript code be optimized for size and execution time (in general smaller Javascript codes execute faster). However, applying obfuscation to Javascript code usually makes the Javascript code larger and slower, which can lead to a poor end-user experience.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
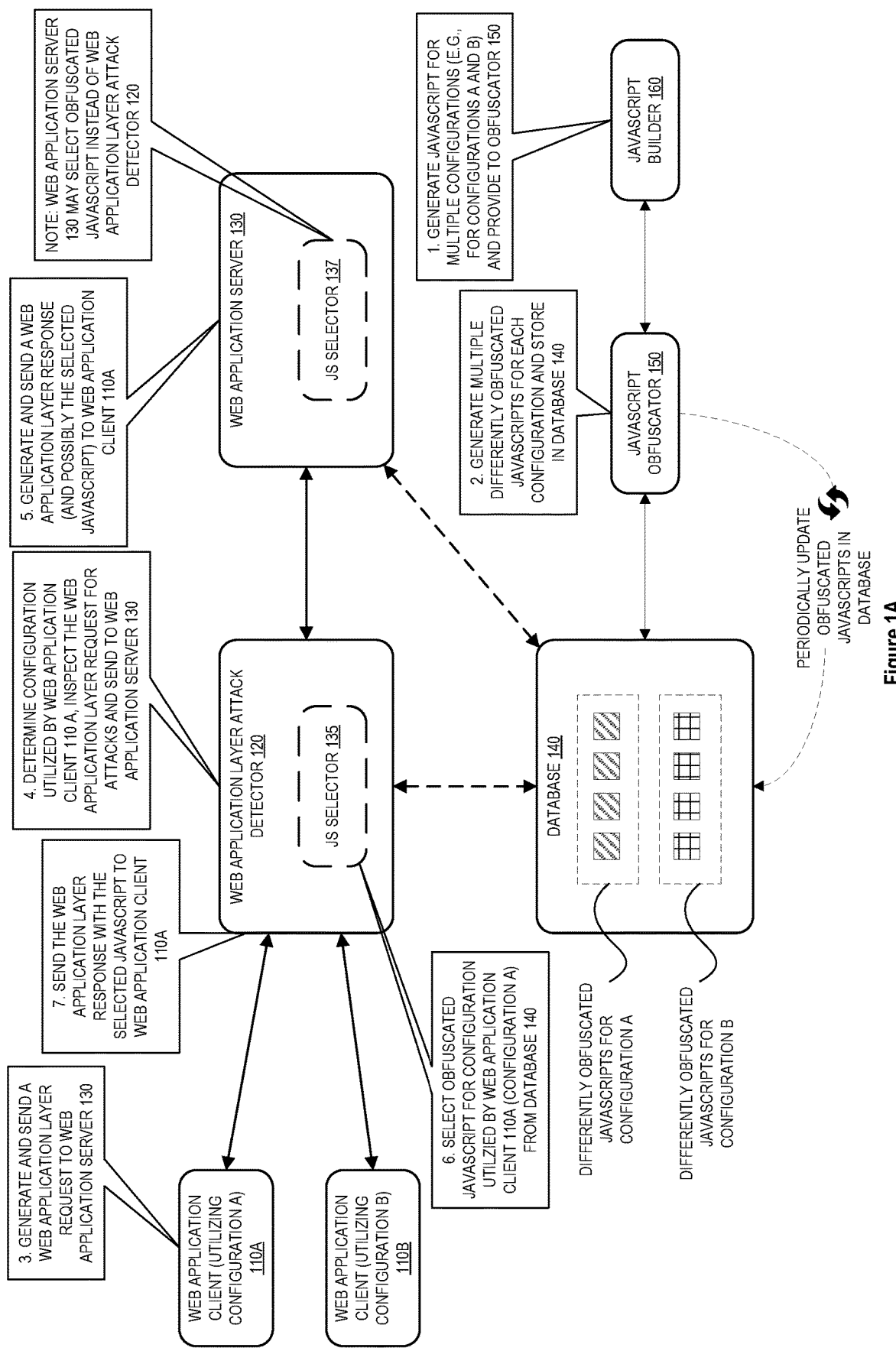
FIG. 1A is a diagram illustrating a system for providing obfuscated Javascript code to web application clients and exemplary operations of various components within the system, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

Embodiments described herein provide a mechanism for providing obfuscated code (e.g., Javascript code) to web application clients. According to some embodiments, a builder component generates codes (e.g., Javascript codes) for multiple possible web application client configurations (e.g., different web browsers and/or different versions of web browsers), where all of the codes provide the same intended functionality, and where each code is compatible with a particular configuration. An obfuscator component obfuscates each of these codes in multiple different ways to generate, for each of the configurations, multiple differently obfuscated codes for that configuration (such that the multiple differently obfuscated codes for that configuration provide the same intended functionality but are obfuscated differently from each other). When a web application layer attack detector receives a web application layer request generated by a web application client, the web application layer attack detector determines a configuration utilized by the web application client based on a header of the web application layer request (e.g., based on the value included in the "User-Agent" header field). The web application layer attack detector then selects, for providing to the web application client with a web application layer response corresponding to the web application layer request, an obfuscated code from the multiple obfuscated codes for the configuration utilized by the web application client. The web application layer attack detector then provides the selected obfuscated code to the web application client with the web application layer response.

FIG. 1A is a diagram illustrating a system for providing obfuscated Javascript code to web application clients and exemplary operations of various components within the system, according to some embodiments.

As illustrated in the diagram, the system includes web application clients 110A and 110B, a web application layer attack detector 120, a web application server 130, a database 140, a Javascript obfuscator 150, and a Javascript builder 160. The web application clients 110 are communicatively coupled to the web application server 130 via the web application layer attack detector 120. For sake of illustration only, the diagram illustrates two web application clients 110 being communicatively coupled to web application server 130 via the web application layer attack detector 120. It should be understood, however, that there can be more or less web application clients 110 than illustrated in the diagram. In one embodiment, the web application layer attack detector 120 and/or the web application server 130 is communicatively coupled to the database 140. The database 140 can be implemented according to a variety of different database models, such as relational (such as PostgreSQL, MySQL, and certain Oracle® products), non-relational, graph, columnar (also known as extensible record; e.g., HBase), object, tabular, tuple store, and multi-model. As illustrated in the diagram, the Javascript builder 160 is communicatively coupled to the Javascript obfuscator 150, which is in turn communicatively coupled to the database 140.

As used herein, a web application client 110 is an application that can access the content and/or services provided by a web application server 130 (e.g., Hypertext Transfer Protocol (HTTP) clients such as a web browser). As used herein, a web application server 130 is an application that provides content or services (e.g., provides web pages or other type of content/services) upon the request of web application clients 110. Each of the web application clients 110 and the web application server 130 may be implemented by one or more electronic/network devices.

Each of the web application clients 110 may generate one or more web application layer requests (e.g., HTTP request messages such as a "POST" HTTP request messages or "GET" HTTP request messages) and send these web application layer requests to the web application server 130. In response to receiving web application layer requests, the web application server 130 may send corresponding web application layer responses (e.g., HTTP response messages) to the web application clients 110. In response to receiving web application layer responses, the web application clients 110 may render the contents of the web application layer responses (e.g., web pages or other type of content) to their respective end-users.

Different web application clients 110 may utilize different configurations for generating/processing web application layer requests/responses. As used herein, the configuration utilized by a web application client 110 may refer to a set of properties of the web application client 110 that indicate the type of code (e.g., Javascript code) the web application client 110 can execute. Such properties may include one or more of the type of software or modules utilized, the version of the software or modules utilized, and the settings of the web application client. For example, different web application clients 110 may utilize different types of web browsers (e.g., Chrome, Firefox, Internet Explorer, etc.) or use different versions of the same web browser, and these different browsers/versions may use different Javascript code to achieve the same intended functionality/effect. For example, different web browsers sometimes use different Javascript code to obtain the language being used by those web browsers (e.g., the Javascript code to obtain the language used by one web browser may be "navigator.userLanguage" while the Javascript code to obtain the language used by another web browser may be "navigator.language"). In the example illustrated in the diagram, web application client 110A and web application client 110B utilize different configurations. More specifically, in this example, web application client 110A utilizes configuration A while web application client 110B utilizes configuration B.

The web application layer attack detector 120 is configured to protect the web application server 130 against web application layer attacks from web application clients 110. The web application layer attack detector 120 may protect the web application server 130 against a variety of attacks including, but not limited to, Structured Query Language injection (SQLi) attacks, Cross-Site Request Forgery (CSRF) attacks, and Remote File Inclusion (RFI) Attacks (e.g., based on applying security rules). The web application layer attack detector 120 can be implemented by one or more electronic devices. The web application layer attack detector 120 may sit inline to the traffic between the web application clients 110 and the web application server 130 such that it can see the traffic being sent between them. In one embodiment, the web application layer attack detector 120 is a web application firewall. While the diagram illustrates the system as including a single web application layer attack detector 120, in some embodiments the system may include multiple web application layer attack detectors 120 (e.g., that are geographically dispersed) to protect the web application server 130 from attacks by the web application clients 110.

The Javascript builder 160 may generate Javascript codes for multiple different web application client configurations. For example, the Javascript builder 160 may generate Javascript codes for multiple different web browsers, where all of the Javascript codes provide the same intended functionality (e.g., bot protection, persistent identification, and client classification), and where each Javascript code is compatible with a particular web browser. The Javascript code that is compatible with a particular configuration may be referred to herein as the Javascript code for that configuration (and more generally, the code that is compatible with a particular configuration may be referred to herein as the code for that configuration). The Javascript builder 160 may generate Javascript code for a configuration based on its knowledge of the types of Javascript code/constructs that are compatible with that configuration (e.g., whether "navigator.userLanguage" or "navigator.language" should be used to obtain the language used by the web browser). The Javascript builder 160 may be aware of the different possible configurations utilized by the web application clients 110 (or the most widely utilized configurations), and may automatically generate customized Javascript code for each of these configurations.

The Javascript obfuscator 150 may obfuscate a given Javascript code in multiple different ways to generate multiple differently obfuscated versions of that Javascript code. This results in multiple obfuscated Javascript codes that provide the same intended functionality but that are obfuscated differently from each other. The Javascript obfuscator 150 may use a variety of obfuscation techniques, as known to those having ordinary skill in the art, to generate obfuscated Javascript code.

One or more components of the system may be deployed in a cloud (e.g., a cloud provided by a cloud provider such as Amazon®, Microsoft®, etc.) and/or on premise (e.g., in an enterprise network). In an exemplary arrangement, the web application layer attack detector 120 is deployed in the cloud while the web application server 130 is deployed on-premise, and any web application layer requests generated by the web application clients 110 that are intended for the web application server 130 are first directed to the web application layer attack detector 120 in the cloud (e.g., by changing Domain Name Service (DNS) records) before being sent to the on-premise web application server 130. It should be understood that other arrangements are also possible. For example, both the web application layer attack detector 120 and the web application server 130 may be deployed in the cloud or both may be deployed on-premise.

Operations for providing obfuscated Javascript code to web application clients 110 will now be described with reference to FIG. 1A and FIG. 1B. Referring to FIG. 1A, at operation 1, the Javascript builder 160 generates Javascript codes for multiple possible configurations (e.g., at least a Javascript code for configuration A and a Javascript code for configuration B) and provides these (non-obfuscated) Javascript codes to the Javascript obfuscator 150. At operation 2, the Javascript obfuscator 150 obfuscates each of the Javascript codes provided by the Javascript builder 160 in multiple different ways to generate, for each of the configurations, multiple differently obfuscated Javascript codes for that configuration and stores these obfuscated Javascript codes in the database 140. For example, the Javascript obfuscator 150 may obfuscate the Javascript code for configuration A (e.g., which was generated and provided by the Javascript builder 160) in multiple different ways to generate multiple differently obfuscated Javascript codes for configuration A and also obfuscate the Javascript code for configuration B (e.g., which was generated and provided by the Javascript builder 160) in multiple different ways to generate multiple differently obfuscated Javascript codes for configuration B, and store all of these obfuscated Javascript codes in the database 140. Thus, the database 140 may store a set of differently obfuscated Javascript codes for configuration A 145A and a set of differently obfuscated Javascript codes for configuration B 145B.

While the diagram illustrates the Javascript builder 160 and the Javascript obfuscator 150 as being separate from the web application layer attack detector 120, in some embodiments, the Javascript builder 160 and the Javascript obfuscator 150 are components that are integrated within the web application layer attack detector 120. It should be noted that the Javascript builder 160 and the Javascript obfuscator 150 may generate and obfuscate Javascript code asynchronously from the traffic processing of the web application layer attack detector 120.

At operation 3, web application client 110A (which utilizes configuration A) may generate and send a web application layer request to the web application server 130. At operation 4, the web application layer attack detector 120 intercepts the web application layer request, determines the configuration utilized by web application client 110A, inspects the web application layer request for attacks, and sends the web application layer request to the web application server 130 (e.g., assuming that the web application layer attack detector 120 determines that it is safe to send the web application layer request to the web application server 130).

The web application layer attack detector 120 may determine the configuration utilized by web application client 110A in a variety of ways. In one embodiment, the web application layer attack detector 120 determines the configuration utilized by web application client 110A based on a value included in the "User-Agent" header field in the header of the web application layer request. The User-Agent header field in the header of the web application layer request is typically used to indicate what software and/or modules are utilized by the web application client 110 making the request, which allows the web application server 130 to customize the web application layer response for the web application client 110. The User-Agent header field may include one or more of a web browser product name and version number, a layout engine name and version number used by the web browser, an identifier of the type of machine and/or operating system of the user, and names of any extensions utilized by the web browser. For example, a User-Agent header field included in the header of a web application layer request generated by the Mozilla® Firefox® web browser executing on a computer utilizing the Microsoft® Windows® 7 operating system may include the following value: "Mozilla/5.0 (Windows; U; Windows NT 6.1; ru; rv:1.9.2) Gecko/20100115 Firefox/3.6." It should be noted that multiple different User-Agent header field values can be treated as a single configuration for purposes of providing obfuscated Javascript code (e.g., if the multiple different types of user agents can use the same Javascript code to achieve particular functionalities/effects).

In one embodiment, the web application layer attack detector 120 determines the configuration utilized by web application client 110A based on one or more of the types of header fields in the header of the web application layer request, an order of the header field in the header of the web application layer request, and one or more values included in the header fields in the header of the web application layer request. This way of determining the configuration utilized by a web application client 110 may be useful, for example, in cases where the web application client 110 (or the end-user of the web application client 110) deliberately changes/populates the value in the User-Agent header field (e.g., to hide information about itself and/or for spoofing purposes). In this example, it is assumed that the web application layer attack detector 120 (correctly) determines that web application client 110A utilizes configuration A. In one embodiment, the web application layer attack detector 120 stores information regarding the configuration utilized by web application client 110A so that it can use this information later (e.g., to select an obfuscated Javascript code, as will be further described herein below).

At operation 5, in response to receiving the web application layer request, the web application server 130 generates a corresponding web application layer response and sends the web application layer response to web application client 110A.

At operation 6, the web application layer attack detector 120 intercepts the web application layer response and the Javascript selector 135 of the web application layer attack detector 120 selects one of the obfuscated Javascript codes for the configuration utilized by web application client 110A from the database 140. In this example, the web application layer attack detector 120 previously determined (e.g., at operation 4) that web application client 110A is utilizing configuration A, and thus, the Javascript selector 135 selects an obfuscated Javascript code for configuration A from the database 140. (e.g., from the set of differently obfuscated Javascript codes for configuration A 145A). The Javascript selector 135 may select one of the obfuscated Javascript codes for configuration A from the database 140 at random or using other selection means (e.g., round robin). At operation 7, the web application layer attack detector 120 sends the web application layer response along with the selected obfuscated Javascript code to web application client 110A. The web application layer attack detector 120 may send or otherwise provide the selected obfuscated Javascript code to web application client 110A using a variety of means. For example, the web application layer attack detector 120 may embed the selected obfuscated Javascript code in the web application layer response that it sends to web application client 110. As another example, the web application layer attack detector 120 may include a link/reference to the selected Javascript code in the web application layer response that it sends to web application client 110A.

Figure 1B:
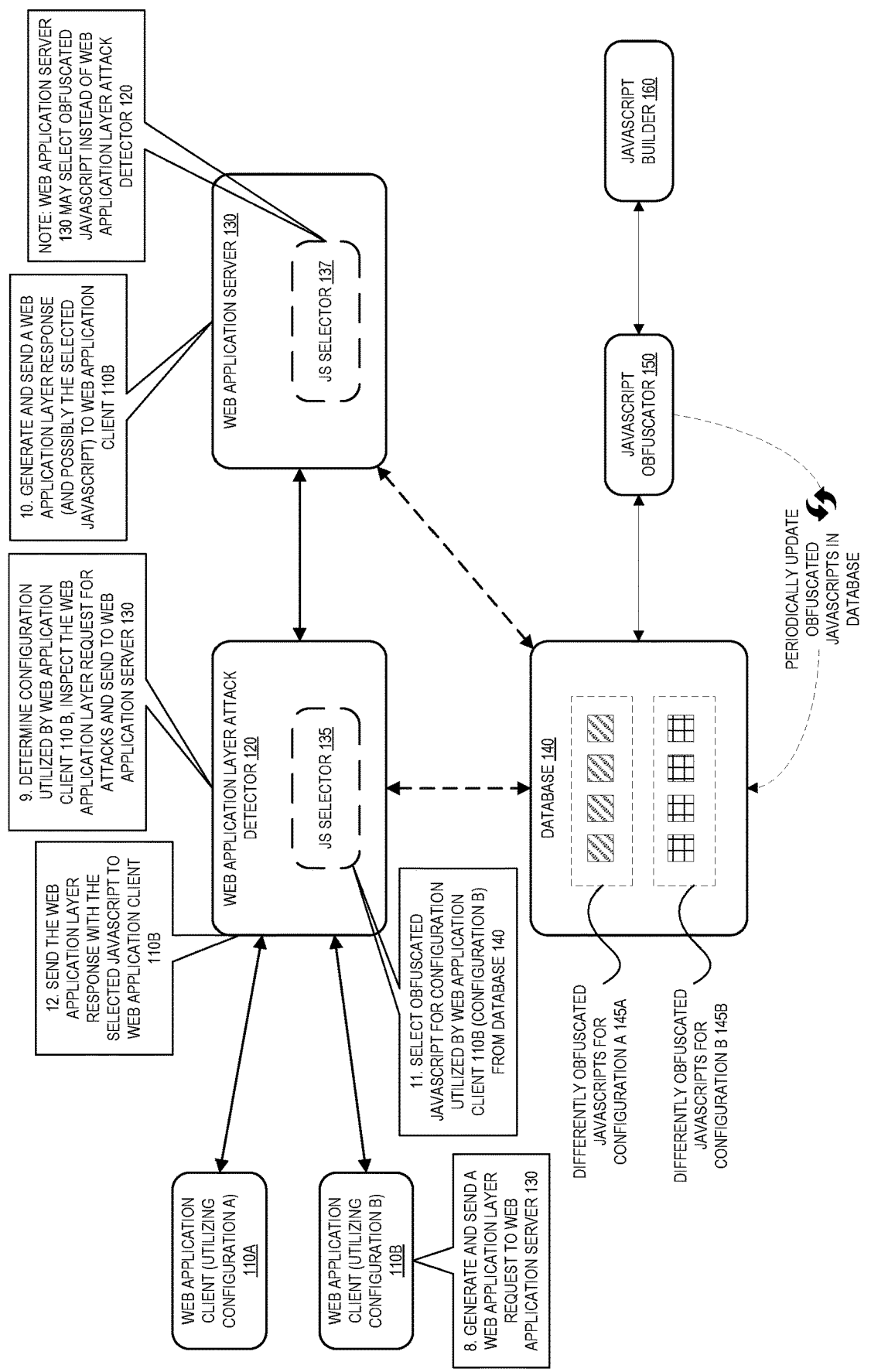
FIG. 1B is a diagram illustrating further exemplary operations of various components within the system, according to some embodiments.

Referring now to FIG. 1B, at operation 8, web application client 110B (which utilizes configuration B) may also generate and send a web application layer request to the web application server 130. At operation 9, the web application layer attack detector 120 intercepts the web application layer request, determines the configuration utilized by web application client 110B, inspects the web application layer request for attacks, and sends the web application layer request to the web application server 130 (e.g., assuming that the web application layer attack detector 120 determines that it is safe to send the web application layer request to the web application server 130). In this example, it is assumed that the web application layer attack detector 120 (correctly) determines that web application client 110B utilizes configuration B (e.g., based on the value included in the User-Agent header field in the header of the web application layer request or using other means). The web application layer attack detector may store information regarding the configuration utilized by web application client 110B so that it can use this information alter (e.g., to select an obfuscated Javascript code).

At operation 10, in response to receiving the web application layer request, the web application server 130 generates a corresponding web application layer response and sends the web application layer response to web application client 110B.

At operation 11, the web application layer attack detector 120 intercepts the web application layer response and the Javascript selector 135 of web application layer attack detector 120 selects one of the obfuscated Javascript codes for the configuration utilized by web application client 110B from the database 140. In this example, the web application layer attack detector 120 previously determined (e.g., at operation 9) that web application client 110B is utilizing configuration B, and thus, the Javascript selector 135 selects an obfuscated Javascript code for configuration B from the database 140 (e.g., at random or using other selection means from the set of differently obfuscated Javascript codes for configuration B 145B). At operation 12, the web application layer attack detector 120 sends the web application layer response along with the selected obfuscated Javascript code to web application client 110B (e.g., by embedding the selected obfuscated Javascript code or a link/reference thereto in the web application layer response).

In one embodiment, the Javascript obfuscator 150 periodically updates the obfuscated Javascript codes in the database 140 with newly obfuscated Javascript code. For example, the Javascript obfuscator 150 may replace the existing obfuscated Javascript codes (e.g., for configuration A and/or configuration B) stored in the database 140 every day with a new set of obfuscated Javascript codes (which are obfuscated differently). This may make the Javascript code even more of a moving target and thus make it more difficult for an attacker to crack the Javascript code.

Embodiments described herein provide several advantages over existing mechanisms for providing Javascript code to web application clients 110. For example, an advantage of embodiments described herein is that they provide Javascript code that is customized/compatible for the configuration utilized by the web application client 110. This is in contrast to existing mechanisms that typically provide a "one-size-fits-all" Javascript code that attempts to handle multiple different configurations in the same code. As such, with embodiments described herein, the size of the Javascript code is smaller and more efficient, thereby reducing bandwidth usage and allowing faster execution times. Another advantage of embodiments described herein is that they allow secure usage of Javascript code by obfuscating Javascript code for a given configuration in multiple different ways, thereby making the Javascript code a moving target for potential attackers. This may help deter reverse-engineering and tampering. Yet another advantage of embodiments described herein is that they allow fast processing of web application layer traffic, as differently obfuscated Javascript codes for multiple different configuration can be pre-generated (e.g., and stored in the database 140) and selected, as needed, instead of having to be generated "on-the-fly" (as web application layer requests/responses are received), which results in reduced latency for the end-user. Thus, embodiments described herein may provide Javascript code to web application clients 110 in a manner that is customized (e.g., to be compatible with a particular web application client configuration), secure (e.g., deters reverse-engineering and/or tampering), and fast (e.g., reduced latency).

While embodiments have been described where the Javascript selector 135 of the web application layer attack detector 120 selects the obfuscated Javascript code for the configuration from the database 140, in other embodiments (e.g., embodiments where there is no web application layer attack detector 120 deployed to protect the web application server 130) the web application server 130 includes a Javascript selector 137 which selects the Javascript code for the configuration (e.g., from the database 140) and the web application server 130 send the selected Javascript code to the web application client 110 along with a web application response.

While various embodiments are described in a context where obfuscated Javascript code is provided to web application clients, this is purely exemplary and not intended to be limiting. It should be understood that the techniques described herein can be used to provide obfuscated code written in other types of languages (besides Javascript) to web application clients 110.

Figure 2:
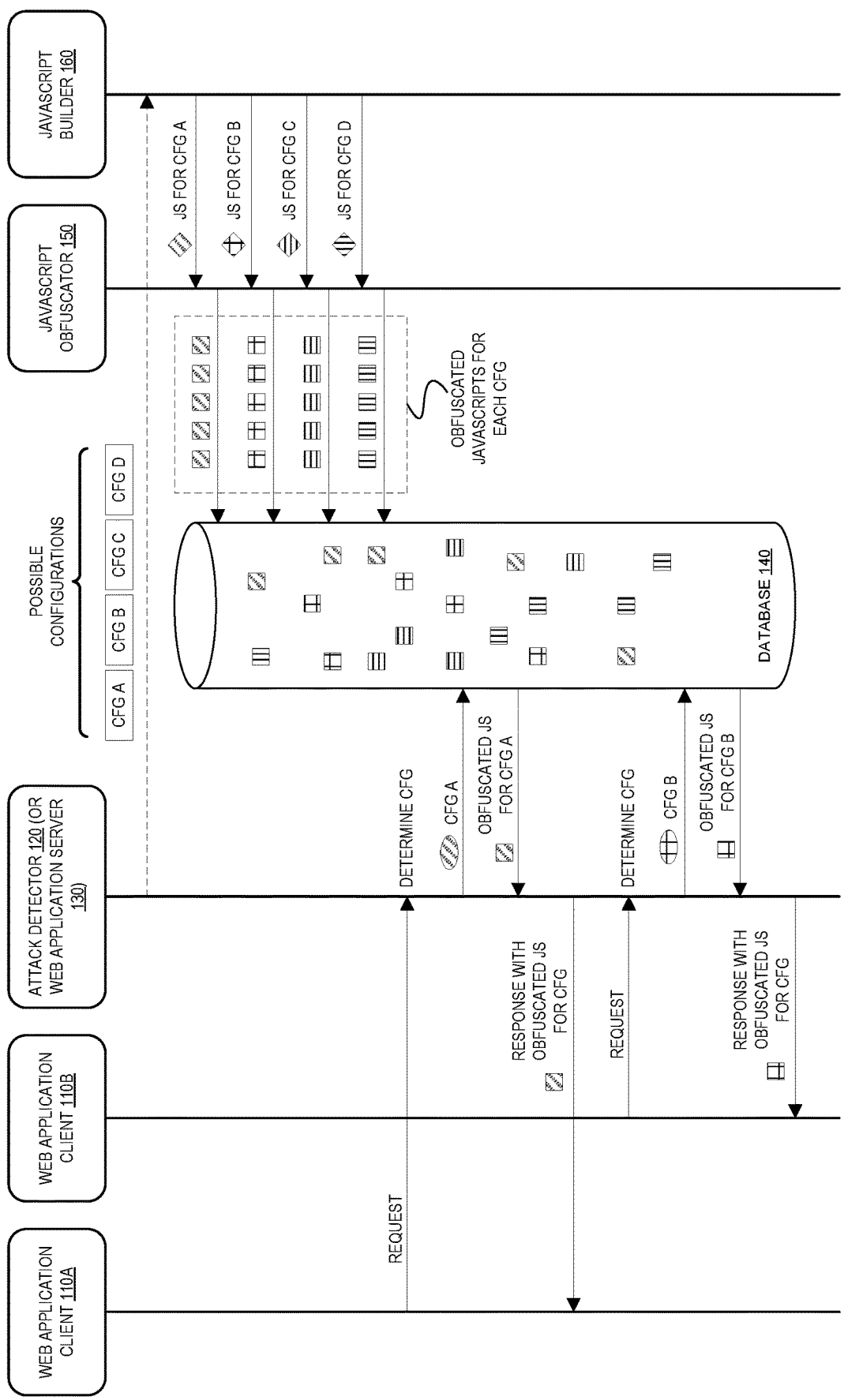
FIG. 2 is a diagram illustrating exemplary operations for providing obfuscated Javascript code to web application clients, according to some embodiments.

FIG. 2 is a diagram illustrating exemplary operations for providing obfuscated Javascript code to web application clients, according to some embodiments.

As illustrated in the diagram, the web application layer attack detector 120 (or web application server 130 in some embodiments) sends information regarding the possible web application client configurations to the Javascript builder 160. In this example, the possible configurations are "CFG A," "CFG B," "CFG C," and "CFG D." The Javascript builder 160 then generates Javascript codes for the possible configurations. That is, the Javascript builder 160 generates Javascript code for configurations "CFG A," "CFG B," "CFG C," and "CFG D," respectively. The Javascript builder 160 then provides these Javascript codes to the Javascript obfuscator 150. The Javascript obfuscator 150 obfuscates each of the Javascript codes provided by the Javascript builder 160 in multiple different ways to generate, for each configuration, multiple differently obfuscated Javascript codes for that configuration. In this example, the Javascript obfuscator 150 obfuscates each of the Javascript codes for configurations "CFG A," "CFG B," "CFG C," and "CFG D," respectively, in five different ways (resulting in the generation of a total of 20 obfuscated Javascript codes). The Javascript obfuscator 150 then stores these obfuscated Javascript codes in the database 140.

Subsequently, web application client 110A may send a web application layer request to the web application server 130, which is intercepted by the web application layer attack detector 120. The web application layer attack detector 120 determines the configuration utilized by web application client 110A based on the header of the web application layer request. In this example, web application layer attack detector 120 (correctly) determines that web application client 110A utilizes configuration "CFG A." The web application layer attack detector 120 thus selects/obtains an obfuscated Javascript code for configuration "CFG A" from the database 140 (e.g., by querying the database 140). The web application layer attack detector 120 then sends the web application layer response corresponding to the web application layer request (which may have been generated by the web application server 130) along with the obfuscated Javascript code to web application client 110A.

Subsequently, web application client 110B may send a web application layer request to the web application server 130, which is intercepted by the web application layer attack detector 120. The web application layer attack detector 120 determines the configuration utilized by web application client 110B based on the header of the web application layer request. In this example, web application layer attack detector 120 (correctly) determines that web application client 110B utilizes configuration "CFG B." The web application layer attack detector 120 thus selects/obtains an obfuscated Javascript code for configuration "CFG B" from the database 140 (e.g., by querying the database 140). The web application layer attack detector 120 then sends the web application layer response corresponding to the web application layer request (which may have been generated by the web application server 130) along with the obfuscated Javascript code to web application client 110B.

Figure 3:
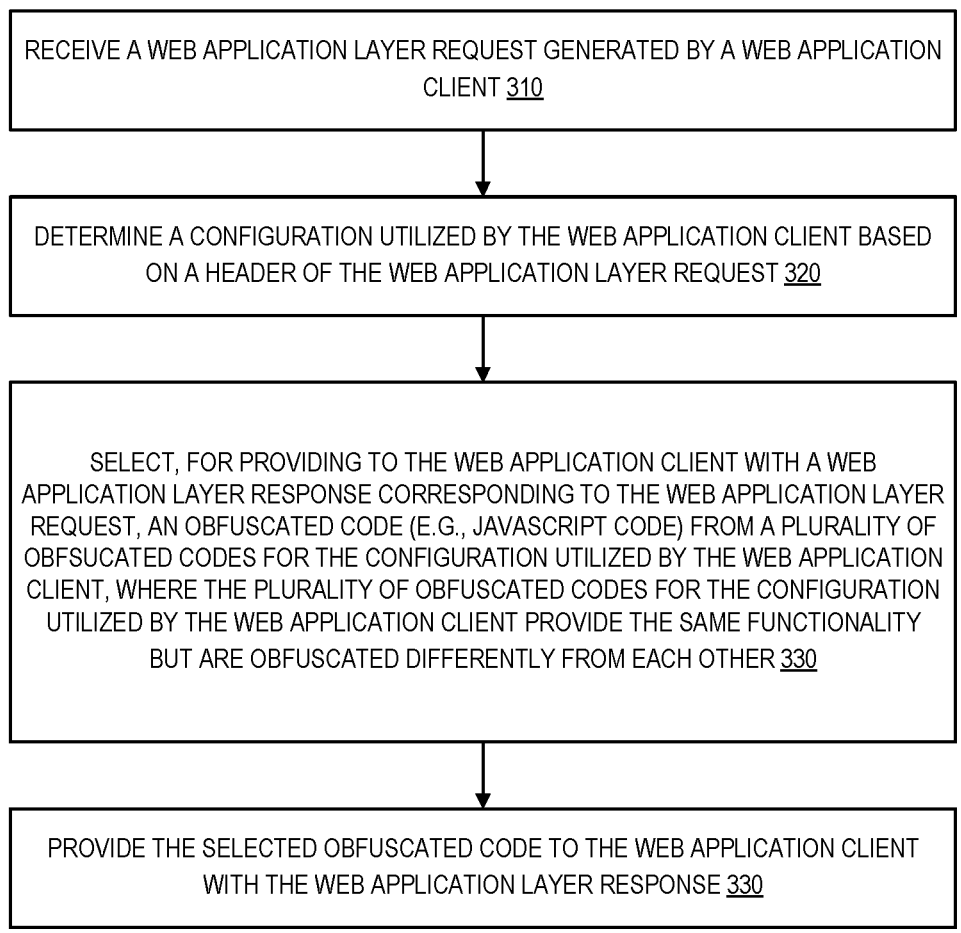
FIG. 3 is a flow diagram of a process for providing obfuscated code to web application clients, according to some embodiments.

FIG. 3 is a flow diagram of a process for providing obfuscated code to web application clients, according to some embodiments. In one embodiment, the process is implemented by one or more network devices implementing a web application layer attack detector 120. While the flow diagram will be described in a context where the process is implemented by a web application layer attack detector 120, it should be understood that the process may be implemented by a different functional entity (e.g., by a web application server 130) or by a combination of functional entities. The process may be implemented using hardware, software, firmware, or any combination thereof.

In one embodiment, the process is initiated at block 310 where the web application layer attack detector receives a web application layer request generated by a web application client.

At block 320, the web application layer attack detector determines a configuration utilized by the web application client based on a header of the web application layer request. In one embodiment, the configuration utilized by the web application client is determined based on a value included in a User-Agent header field in the header of the web application layer request. In one embodiment, the configuration utilized by the web application client corresponds to a type and version of a web browser that generated the web application layer request. In one embodiment, the configuration utilized by the web application client is determined based on one or more of the types of header fields in the header of the web application layer request, an order of header fields in the header of the web application layer request, and one or more values included in the header fields in the header of the web application layer request.

At block 330, the web application layer attack detector selects, for providing to the web application client with a web application layer response corresponding to the web application layer request, an obfuscated code from a plurality of obfuscated codes for the configuration utilized by the web application client, where the plurality of obfuscated codes for the configuration utilized by the web application client provide the same intended functionality (the same or essentially the same functionality such as bot protection, persistent identification, and client classification) but are obfuscated differently from each other. In one embodiment, the plurality of obfuscated codes for the configuration utilized by the web application client are obfuscated Javascript codes. In one embodiment, the plurality of obfuscated codes for the configuration utilized by the web application client is stored in a database (and selected from the database), where the database further stores, for each of one or more other web application client configurations, a plurality of obfuscated codes for that web application client configuration, where the plurality of obfuscated codes for that web application client configuration provide the same intended functionality but are obfuscated differently from each other. In one embodiment, the database is periodically updated to include new obfuscated code for the configuration utilized by the web application client that is obfuscated differently from existing obfuscated codes for the configuration utilized by the web application client stored in the database. In one embodiment, the selection of the obfuscated code from the plurality of obfuscated codes for the configuration utilized by the web application client is at random.

At block 330, the web application layer attack detector sends the selected obfuscated code to the web application client with the web application layer response.

Figure 4:
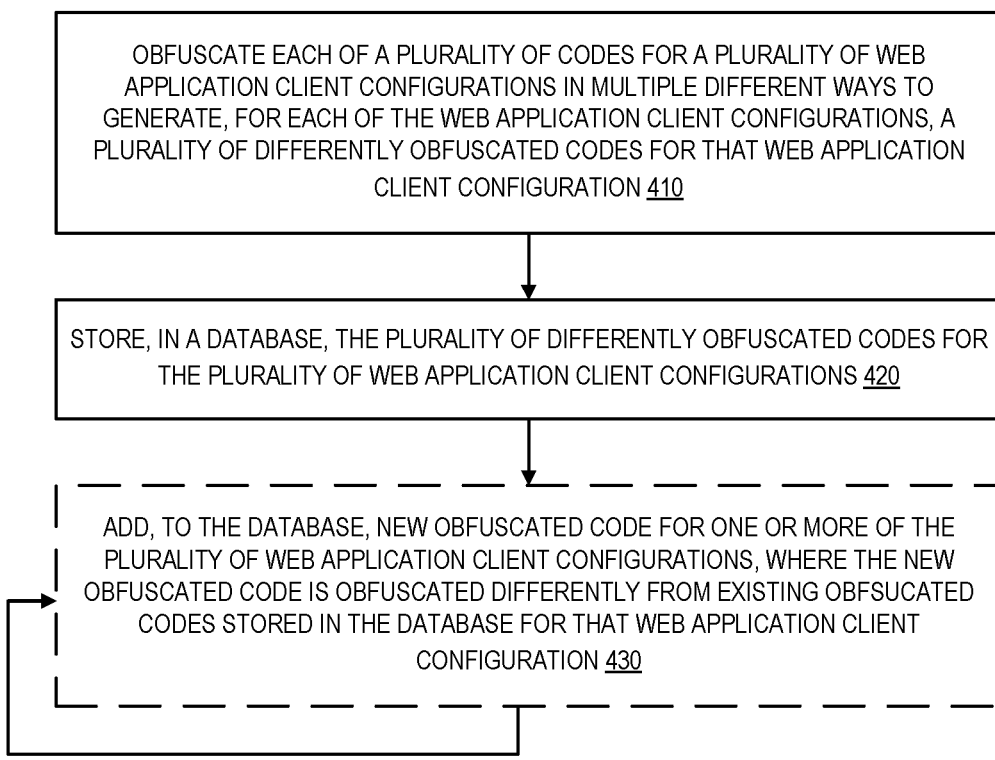
FIG. 4 is a flow diagram of a process for generating obfuscated code, according to some embodiments.

FIG. 4 is a flow diagram of a process for generating obfuscated code, according to some embodiments. In one embodiment, the process is implemented by one or more network devices implementing an obfuscator (e.g., Javascript obfuscator 150). The process may be implemented using hardware, software, firmware, or any combination thereof.

In one embodiment, the process is initiated at block 410 where the obfuscator obfuscates each of a plurality of codes (providing the same desired/intended functionality) for a plurality of web application client configurations in multiple different ways to generate, for each of the web application client configurations, a plurality of differently obfuscated codes (e.g., obfuscated Javascript codes) for that web application client configuration.

At block 420, the obfuscator stores, in a database, the plurality of differently obfuscated codes for the plurality of web application client configurations.

In one embodiment, at block 430, the obfuscator adds, to the database, new obfuscated code for one or more of the plurality of web application client configurations, where the new obfuscated code is obfuscated differently from existing obfuscated codes stores in the database for that web application client configuration. The obfuscator may repeat the operation of block 430 to periodically generate and add new obfuscated code to the database.

Figure 5:
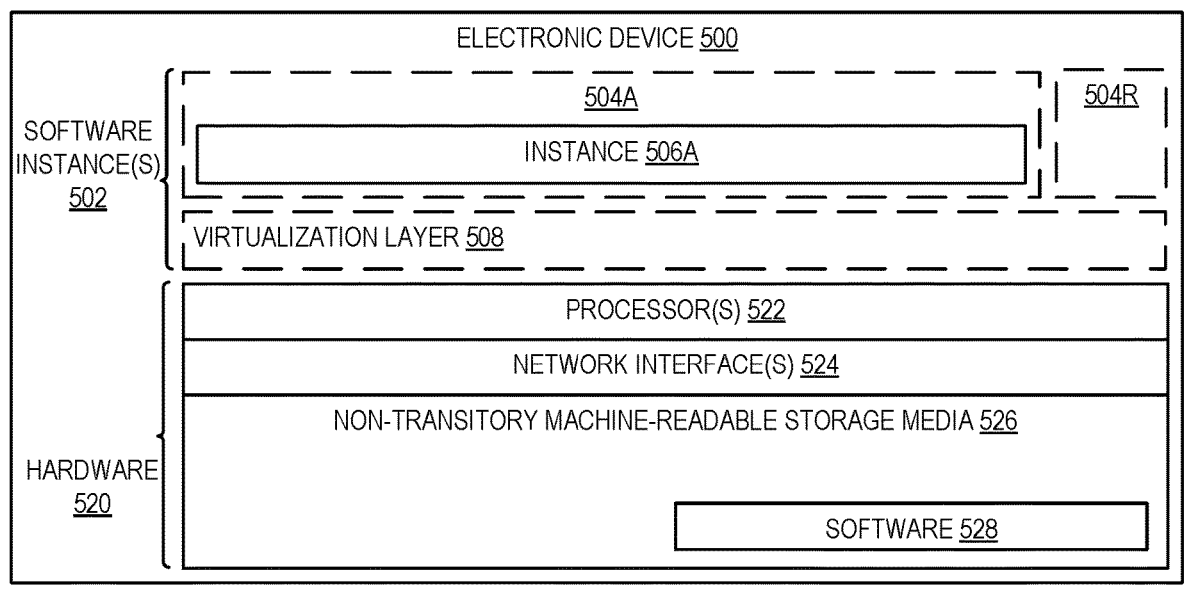
FIG. 5 is a block diagram illustrating an electronic device, according to some embodiments.

FIG. 5 is a block diagram illustrating an electronic device, according to some embodiments. FIG. 5 illustrates hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Software 528 can include code, which when executed by hardware 520, causes the electronic device 500 to perform operations of one or more embodiments described herein. Thus, as previously described, the web application layer attack detector 120 and/or the web application server 130 (e.g., including the Javascript selectors 130 and/or 137) may be implemented in one or more electronic devices. Also, the web application clients 110, the database 140, the Javascript builder 160, and the Javascript obfuscator may each be implemented in one or more electronic devices.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more network devices for providing obfuscated code to web application clients, the method comprising:
    receiving a web application layer request generated by a web application client;
    determining a configuration utilized by the web application client based on a header of the web application layer request, wherein the configuration utilized by the web application client is indicative of the type of code that is compatible with the web application client;
    selecting, for providing to the web application client with a web application layer response corresponding to the web application layer request, an obfuscated code from a plurality of obfuscated codes for the configuration utilized by the web application client, wherein the plurality of obfuscated codes for the configuration utilized by the web application client provide the same intended functionality but are obfuscated differently from each other; and
    providing the selected obfuscated code to the web application client with the web application response.

2. The method of claim 1, wherein the configuration utilized by the web application client is determined based on a value included in a User-Agent header field in the header of the web application layer request.

3. The method of claim 1, wherein the configuration utilized by the web application client corresponds to a type and version of a web browser that generated the web application layer request.

4. The method of claim 1, wherein the configuration utilized by the web application client is determined based on one or more of: the types of header fields in the header of the web application layer request, an order of header fields in the header of the web application layer request, and one or more values included in the header fields in the header of the web application layer request.

5. The method of claim 1, wherein the plurality of obfuscated codes for the configuration utilized by the web application client is stored in a database, wherein the database further stores, for each of one or more other web application client configurations, a plurality of obfuscated codes for that web application client configuration, wherein the plurality of obfuscated codes for that web application client configuration provide the same intended functionality but are obfuscated differently from each other.

6. The method of claim 5, wherein the database is periodically updated to include new obfuscated code for the configuration utilized by the web application client that is obfuscated differently from existing obfuscated codes for the configuration utilized by the web application client stored in the database.

7. The method of claim 1, wherein the selecting the obfuscated code from the plurality of obfuscated codes for the configuration utilized by the web application client is at random.

8. The method of claim 1, wherein the plurality of obfuscated codes for the configuration utilized by the web application client are obfuscated Javascript codes.

9. The method of claim 1, wherein the one or more network devices implement a web application layer attack detector communicatively coupled between the web application client and a web application server.

10. The method of claim 1, wherein the one or more network devices implement a web application server.

11. A set of one or more non-transitory machine-readable storage media storing instructions which, when executed by one or more processors of one or more network devices, causes the one or more network devices to perform operations for providing obfuscated code to web application clients, the operations comprising:
- receiving a web application layer request generated by a web application client;
- determining a configuration utilized by the web application client based on a header of the web application layer request, wherein the configuration utilized by the web application client is indicative of the type of code that is compatible with the web application client;
- selecting, for providing to the web application client with a web application layer response corresponding to the web application layer request, an obfuscated code from a plurality of obfuscated codes for the configuration utilized by the web application client, wherein the plurality of obfuscated codes for the configuration utilized by the web application client provide the same intended functionality but are obfuscated differently from each other; and
- providing the selected obfuscated code to the web application client with the web application response.

12. The set of one or more non-transitory machine-readable storage media of claim 11, wherein the configuration of utilized by the web application client is determined based on a value included in a User-Agent header field in the header of the web application layer request.

13. The set of one or more non-transitory machine-readable storage media of claim 11, wherein the configuration utilized by the web application client corresponds to a type and version of a web browser that generated the web application layer request.

14. The set of one or more non-transitory machine-readable storage media of claim 11, wherein the configuration utilized by the web application client is determined based on one or more of: the types of header fields in the header of the web application layer request, an order of header fields in the header of the web application layer request, and one or more values included in the header fields in the header of the web application layer request.

15. The set of one or more non-transitory machine-readable storage media of claim 11, wherein the plurality of obfuscated codes for the configuration utilized by the web application client is stored in a database, wherein the database further stores, for each of one or more other web application client configurations, a plurality of obfuscated codes for that web application client configuration, wherein the plurality of obfuscated codes for that web application client configuration provide the same intended functionality but are obfuscated differently from each other.

16. A network device configured to provide obfuscated code to web application clients, the network device comprising:
- one or more processors; and
- a non-transitory machine-readable storage medium having instructions stored therein, which when executed by the one or more processors, cause the network device to:
  - receive a web application layer request generated by a web application client,
  - determine a configuration utilized by the web application client based on a header of the web application layer request, wherein the configuration utilized by the web application client is indicative of the type of code that is compatible with the web application client,
  - select, for providing to the web application client with a web application layer response corresponding to the web application layer request, an obfuscated code from a plurality of obfuscated codes for the configuration utilized by the web application client, wherein the plurality of obfuscated codes for the configuration utilized by the web application client provide the same intended functionality but are obfuscated differently from each other, and
  - provide the selected obfuscated code to the web application client with the web application response.

17. The network device of claim 16, wherein the configuration utilized by the web application client is determined based on a value included in a User-Agent header field in the header of the web application layer request.

18. The network device of claim 16, wherein the plurality of obfuscated codes for the configuration utilized by the web application client are obfuscated Javascript codes.

19. The network device of claim 16, wherein the network device implements a web application layer attack detector communicatively coupled between the web application client and a web application server.

20. The network device of claim 16, wherein the network device implements a web application server.

* * * * *